United States Patent [19]

Confer

[11] 4,070,430
[45] Jan. 24, 1978

[54] METHOD FOR BLOW MOLDING AND TRANSFER MOLDING THERMOPLASTIC MATERIAL

[75] Inventor: Raymond C. Confer, Gasport, N.Y.

[73] Assignee: Air Lock Plastics, Inc., Tonawanda, N.Y.

[21] Appl. No.: 681,228

[22] Filed: Apr. 28, 1976

Related U.S. Application Data

[60] Continuation of Ser. No. 520,622, Nov. 4, 1974, abandoned, Division of Ser. No. 310,896, Nov. 30, 1972, Pat. No. 3,869,239.

[51] Int. Cl.² .................................. B29C 17/07
[52] U.S. Cl. ........................ 264/98; 264/155; 264/163; 264/296
[58] Field of Search .............. 264/89, 90, 92, 94, 264/96–99, 155, 163, 296; 425/290, 292, 296, 298, 302, 302 B, 305, 305 B, 387 R, 387 B, 326 B, 388

[56] References Cited

U.S. PATENT DOCUMENTS

| 2,541,249 | 2/1951 | Hobson | 425/DIG. 214 |
| 3,050,773 | 8/1962 | Hagen | 425/DIG. 214 |
| 3,317,955 | 5/1967 | Schurman et al. | 264/98 X |
| 3,821,344 | 6/1974 | Peters | 264/296 X |

Primary Examiner—Jan H. Silbaugh
Attorney, Agent, or Firm—Christel & Bean

[57] ABSTRACT

A method of combining a transfer molding operation with a blow molding operation to form an article having wall sections of different thicknesses. The major portion of an extruded parison fed between a pair of mold sections and enclosed thereby is expanded into conformity with the cavity defined by the mold sections. An intermediate portion of the parison is directed into a cavity and displaced therefrom by opposed portions on the mold sections into a desired space to completely fill such spaced forming a wall section having a different wall thickness than the remainder of the article.

4 Claims, 7 Drawing Figures

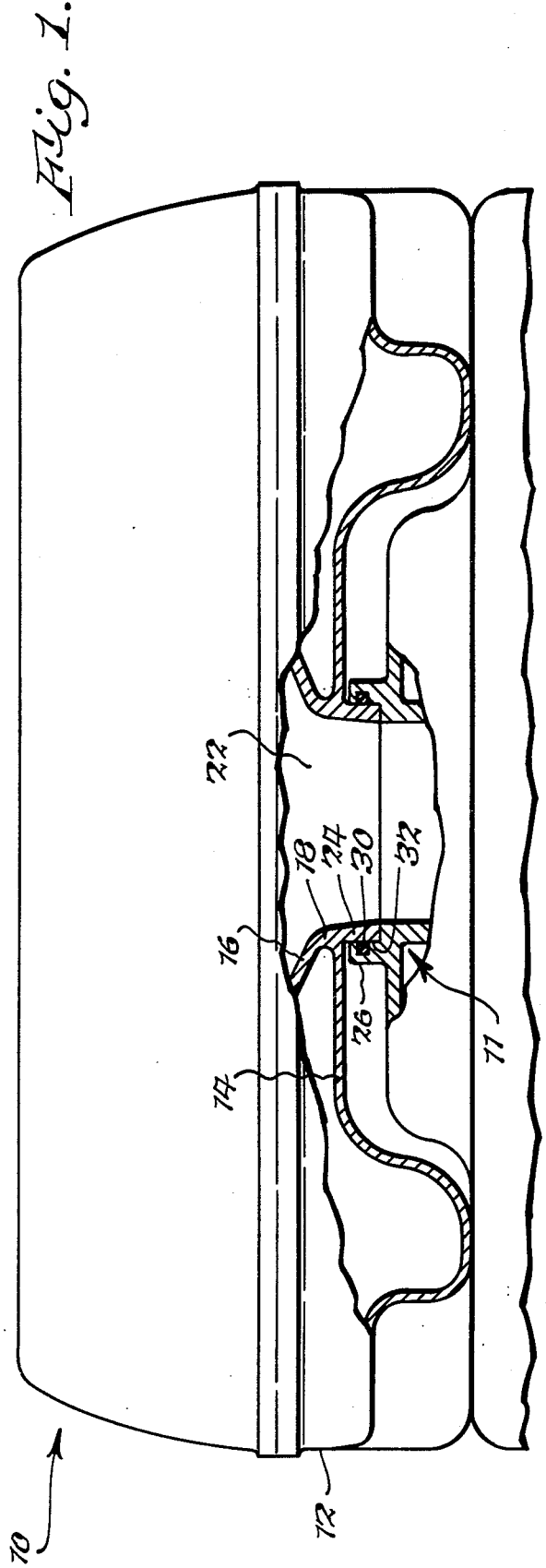
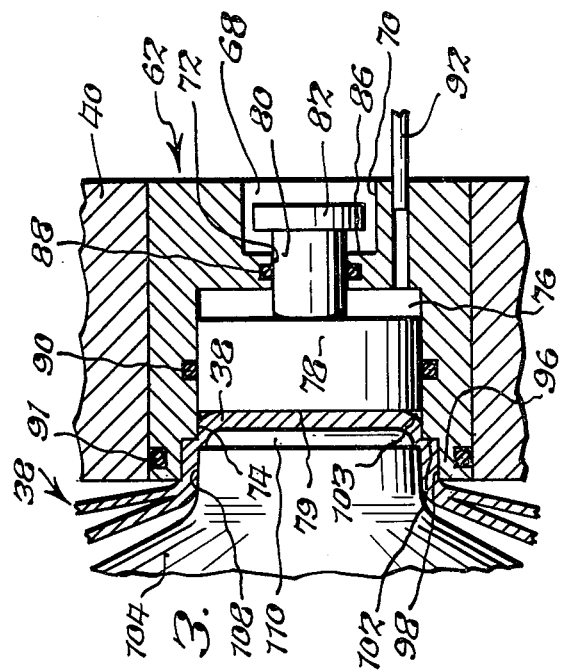
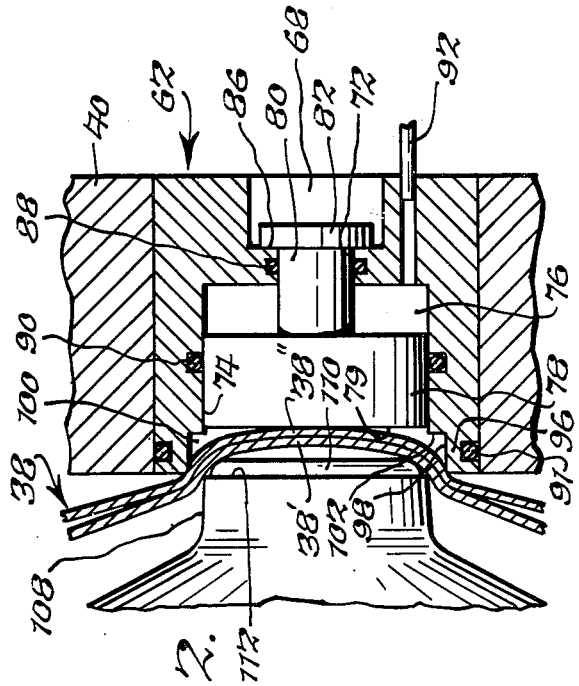

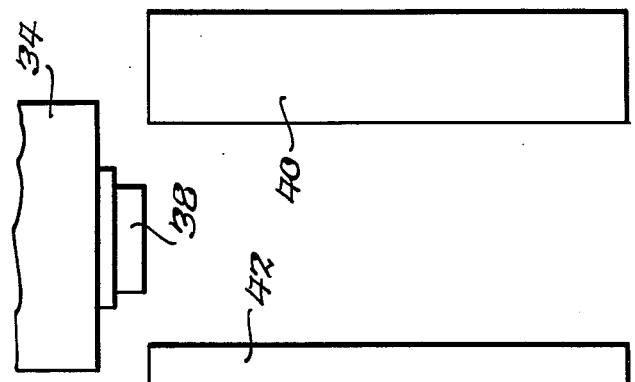
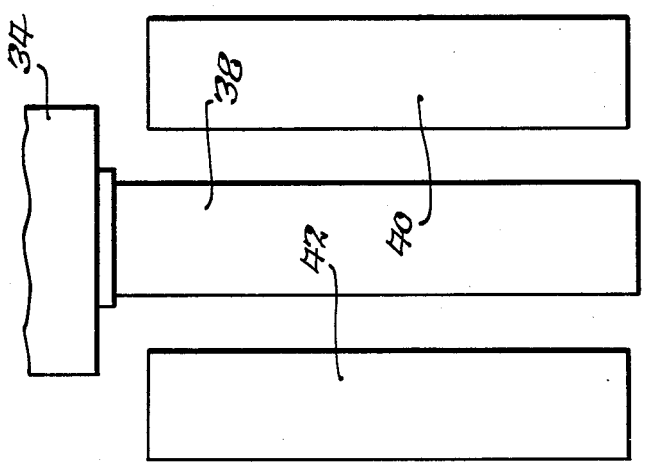
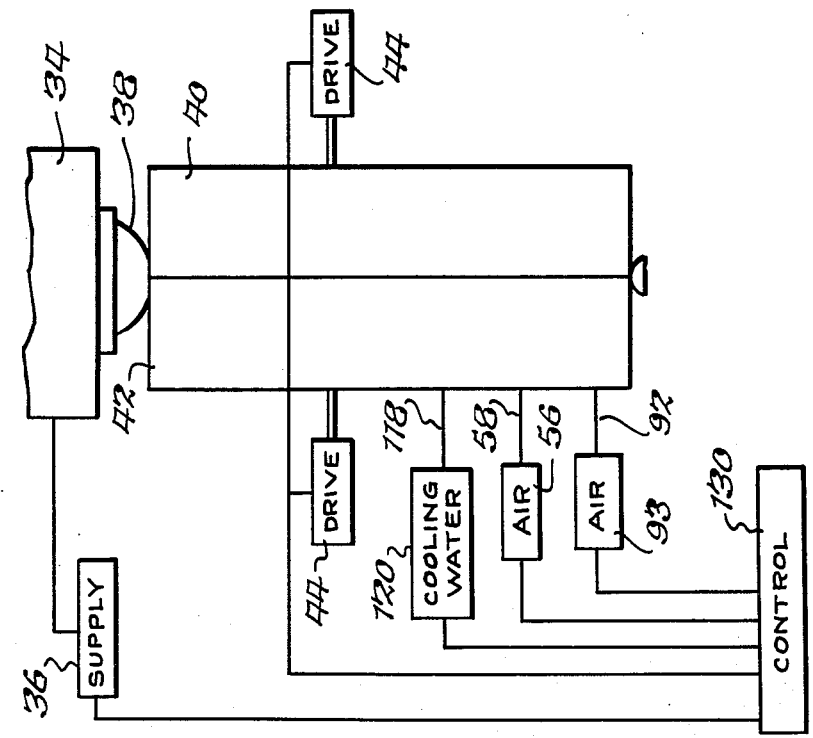

METHOD FOR BLOW MOLDING AND TRANSFER MOLDING THERMOPLASTIC MATERIAL

This is a continuation of application Ser. No. 520,622 filed Nov. 4, 1974, now abandoned, the latter being a division of U.S. Ser. No. 310,896 filed Nov. 30, 1972 and issued as U.S. Pat. No. 3,869,239.

BACKGROUND OF THE INVENTION

The present invention relates generally to the blow molding of thermoplastic material and, more particularly, to a method of blow molding plastic articles in combination with a transfer molding technique. While not limited thereto, this invention is particularly concerned with the molding of plastic articles of one-piece construction having at least one wall section of a different thickness than the wall thickness of the major portion of the finished article.

It has been found that blow molding is a relatively inexpensive and efficient process for molding hollow plastic articles or articles of a double wall construction having substantially uniform wall thicknesses. However, a problem arises where it is desired to vary the wall thickness of certain portions of the article being formed, especially where a wall section of a thickness greater than the wall thickness of the parison is desired. Also, the flowing thermoplastic material in a blow molding operation tends to thin out as the material is stretched during blowing, this thinning out being especially pronounced at relatively sharp corners producing weaker portions at and adjacent to such corners. Moreover, voids or spaces are formed along the mold surfaces adjacent these corners to produce irregularities in the finished surfaces. This is especially undesirable where such surfaces are intended as sealing surfaces.

SUMMARY OF THE INVENTION

Accordingly, it is an object of the present invention to overcome the above noted disadvantages by providing a novel method of molding plastic articles of one-piece construction having wall sections of varying thicknesses and smooth, uniform outer surfaces.

It is another object of this invention to provide a method of blow molding plastic articles in combination with a transfer molding technique.

It is a further object of the present invention to provide a combined blow molding and transfer molding method for molding plastic articles having wall sections of varied thicknesses.

The foregoing and other objects, advantages, and characterizing features of the present invention will become clearly apparent from the ensuing detailed description thereof, taken together with the accompanying drawings wherein like reference characters denote like parts throughout the various views.

BRIEF DESCRIPTION OF THE DRAWINGS

FIG. 1 is a front elevational view of an illustrative plastic article formed by the method and apparatus of this invention, showing portions thereof broken away to illustrate the mounting thereof on a second component;

FIG. 2 is a fragmentary, vertical sectional view taken through the central portion of a mold assembly of this invention, showing the mold parts moving toward each other;

FIG. 3 is a view similar to FIG. 2 but showing the mold parts positioned closer to each other;

FIGS. 5–7 are schematic views illustrating the mold sections of this invention in various positions relative to the tubular parison.

DETAILED DESCRIPTION OF A PREFERRED EMBODIMENT

Figure 4:
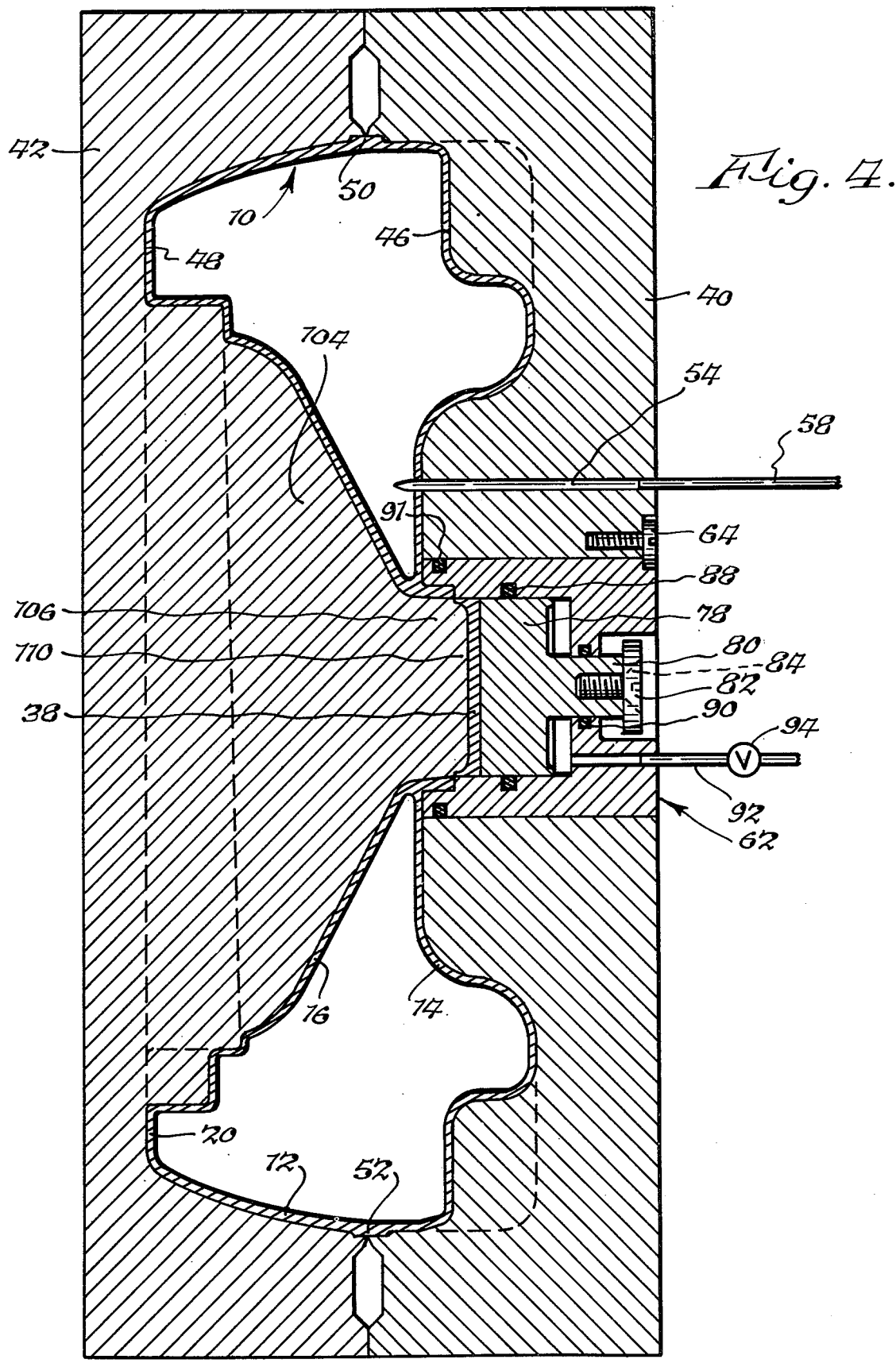
FIG. 4 is a vertical sectional view showing the mold sections completely closed.

Referring now in detail to the illustrative embodiment depicted in the accompanying drawings, there is shown apparatus of this invention for molding a thermoplastic article of the type illustrated in FIG. 1. The specific article depicted in FIGS. 1 and 4 is a toilet bowl, generally designated 10, used in conjunction with a discharge receiving tank 11 and comprising a relatively deep body of hollow, double wall construction formed by an outer shell having a side wall 12 and a bottom wall 14, and an inner shell 16 joined at its opposite ends to bottom wall 14 and side wall 12 of the outer shell at a juncture 18 and by a top wall in the form of a ledge 20 adapted to support a toilet seat (not shown).

Bowl 10 is provided with an outlet 22 (FIG. 1) defined by an annular wall portion 24 extending downwardly from the annular juncture 18 between the inner and outer shells. As shown in FIG. 1, annular wall 24 is telescopically received within the filler neck 26 of receiving tank 11 upon which bowl 10 is supported. An annular seal ring 30 is disposed about annular wall 24 for providing a fluid tight seal between wall 24 and filler neck 26. In order to effect a proper fluid tight seal about an annular wall 24, it is important that the outer peripheral surface 32 thereof be in a true round and smooth condition without any surface irregularities therein. It is also necessary to form the cantilevered wall 24 thicker than the wall thickness of the inner and outer shells for strength and added rigidity.

In accordance with the present invention, annular wall 24 is molded integrally with bowl 10 by a combined blow molding and transfer molding operation as follows:

With reference to FIGS. 5–7, a molten plastic material, such as plasticized polyethylene for example, is fed into an extrusion die 34 by conventional feed means, not shown, from a suitable supply 36 (FIG. 7). The molten plastic is extruded from die 34 as a tubular parison 38, and is gravity fed downwardly between mold sections 40 and 42 which are mounted for movement into and out of engagement about parison 38. Mold sections 40 and 42 can be pivotally mounted or otherwise supported and can be moved by conventional drive means 44. The free end of parison 38 is disposed below the lower ends of mold sections 40 and 42 before such sections engage parison 38 to insure that the enclosed portion of parison 38 extends from the top to the bottom of said mold sections 40 and 42.

Mold sections 40 and 42 are provided with cavities 46 and 48, respecitvely, and when these mold sections 40 and 42 are engaged, as shown in FIGS. 4 and 7, cavities 46 and 48 form a composite mold cavity defining the outer surface configuration of the finished bowl 10.

Mold sections 40 and 42 are provided with knife-edge formations 50 and 52 (FIG. 4) extending completely around mold cavities 46 and 48 and are adapted to engage each other for severing and enclosing a portion of parison 38 within the mold sections 40 and 42. If desired, either mold section can be provided with a flat surface, serving as a bed plate engageable by the knife-edge formation of the other mold section.

Mold section 40 carries means for introducing expansion fluid into the enclosed parison portion, such means comprising a needle 54 which is mounted in mold section 40 and projects inwardly of the cavity defining face thereof through the wall of the enclosed parison. A source of compressed air 56 (FIG. 7) is connected via conduit 58 to needle 54 for introducing compressed air into the enclosed, hollow parison, expanding the same into engagement with the mold cavity walls, causing the enclosed parison to assume the shape of the composite mold cavity as shown in FIG. 4.

In forming the specially shaped body 10, it is important that the formation of annular wall 24 be of the desired thickness throughout and that the outer surface thereof be uniform and smooth. It has been found that the flow of the thermoplastic material in a conventional blow molding operation tends to thin out, especially about relatively sharp bends or corners, such as that provided at juncture 18 to prevent complete filling of the annular space between the mold sections at such corners. As a result of the reduced wall thickness at such bend, the finished annular wall portion has a weakened zone at the juncture thereof with the hollow plastic body rendering it especially vulnerable to shear forces acting at such juncture. Also, the flowing material about such bend does not completely fill the space adjacent thereto, producing minute voids or spaces adjacent the mold surface which result in an irregular surface on the finished article. This, of course, presents problems, and is especially intolerable when such surface is intended as a sealing surface.

An important feature of the present invention resides in controlled transfer molding means for displacing a portion of the thermoplastic material during the blow molding cycle to desired areas for completely filling the same, insuring the formation of accurate and solid wall thicknesses and smooth surace conditions. To this end, an insert, generally designated 62, is releasably secured in mold section 40 by a plurality of fasteners 64. Insert 62 is provided with an axial bore having a first portion 68 defined by a cylindrical wall surface 70, an intermediate bore portion 72 of reduced diameter, and an enlarged diameter portion defined by a cylindrical wall surface 74 forming a chamber 76 therein. A reciprocable back-up member, in the form of a piston 78 having an outer face or surface 79, is mounted in chamber 76 and is provided with a rod 80 extending through bore portion 72. A cap plate 82 is removably secured to the outer end of rod 80 by a fastener 84 to facilitate removal of piston 78 from insert 60. Plate 82 serves as a stop engagable with an abutment shoulder 86 formed between bore portions 68 and 72 to limit extended movement of piston 78 toward the other mold section 42. Suitable O-rings 88, 90 and 91 are provided about the peripheries of rod 80, piston 78 and insert 62 to prevent fluid leakage thereby. Chamber 76 is connected to a suitable source of fluid pressure, such as the compressed air source 93 (FIG. 7) via conduit 92 and a control valve 94 for biasing piston 78 into its extended position toward mold section 42.

The inner end of insert 62 is provided with a portion 96 of reduced wall thickness having an inner surface 98 defining a further enlarged diameter bore or opening 100 (FIG. 2) communicating with chamber 76 and being concentric therewith. Opening 100 terminates in an abutment shoulder 102 which serves as a seat for the end portion of a male projection forming a part of mold section 42, as will presently appear. Surface 98 and abutment shoulder 102 define molding surfaces which form the outer portion of annular wall 24 of the finished body 10. Surfaces 74 and 98, abutment shoulder 102 and the upper face 79 of piston 78 define a well or cavity 103 for receiving an intermediate portion of the thermoplastic material upon closing movement of mold sections 40 and 42.

The other mold section 42 is provided with a bowl-like portion 104 facing mold section 40 and having a cylindrical male projection 106 formed integral therewith and adapted to be received within opening 100 of insert 62. Projection 106 has a tapered peripheral surface 108 which serves as the opposite molding surface for the inner portion of annular wall 24 of the finished body 10. The axial end of projection 106 is provided with a boss 110 of lesser diameter than projection 106 and is adapted to be received in chamber 76 when mold section 40 and 42 are fully closed. The transition between projection 106 and the reduced diameter boss 110 defines an annular shoulder 112 adapted to seat on abutment shoulder 102 when mold sections 40 and 42 are closed, as shown in FIG. 5.

As mold sections 40 and 42 move toward a closed position about parison 38, boss 110 engages a portion of one wall 38' of parison 38 and urges it against a portion of the other wall 38" thereof, carrying both parison wall portions therewith into cavity 103, as shown in FIG. 2. Accordingly, a parison double wall thickness is directed into cavity 103 between the opposed faces of boss 110 and piston 78.

Prior to the closing of mold sections 40 and 42, air under pressure is directed into chamber 76 behind piston 78 to urge the latter into an extended postion, as limited by the engagement of plate 82 with abutment surface 86, as shown in FIG. 2. This provides a resiliently biased back-up surface 79 against which the double wall parison portion is forced by boss 110. As boss 110 continues to move into cavity 103 toward surface 79 during the closing movement of mold sections 40 and 42, the pressure differential caused by the greater pressure acting on piston face 79 than the air pressure acting against the rear face of piston 78 causes the latter to be moved rearwardly in chamber 76. When these two pressures equalize, piston 78 will remain stationary, as shown in FIG. 3, and upon further relative movement of boss 110 toward piston 78 during the final closing movement of mold sections 40 and 42, the thermoplastic material in cavity 103 is partially displaced therefrom and extruded through the annular clearance between shoulders 102 and 112 into the annular space defined between wall surface 98 and projection peripheral surface 108. Thus, a portion of the thermoplastic material deposited in cavity 103 is positively displaced or transferred therefrom and forced into the annular space between opposed wall surfaces 98 and 108 to form annular wall 24 of the finished body 10. By transferring the plastic material under the influence of positive pressure displacement under controlled conditions, this annular space is completely filled, assuring the desired wall thickness of the finished annular wall 24 as well as the formation of smooth and true round surfaces thereon. In the specific article shown in the illustrative embodiment, annular wall 24 is made thicker than the wall thickness of bowl 10 and thicker than the wall thickness of parison 38. However, the annular wall 24 can be made thinner than the wall thickness of bowl 10, if desired, by means of the positive transfer molding technique incorporated in the molding process and apparatus of this invention. As a result, wall sections are not limited to uniform thicknesses as is common in blow molding processes, but can be varied, as desired, by incorporating the above described transfer molding operation in the blow molding cycle.

Upon the closing of mold sections 40 and 42, shoulder 112 engages abutment shoulder 102 (FIG. 4) to sever the disc-shaped portion of thermoplastic material remaining in cavity 103. However, shoulder 112 can be formed so as not to abut against shoulder 102 when mold sections 40 and 42 are closed, thereby leaving a small clearance therebetween maintaining the thermoplastic material intact in one piece. The disc-like portion of thermoplastic material closing the outer end of annular wall 24 can be subsequently removed after the finished article is removed from between mold sections 40 and 42.

After mold sections 40 and 42 are closed, air is introduced into the enclosed parison 38 via conduit 58 and needle 54 to expand the parison 38 into engagement with the mold cavity walls, causing the remainder of the parison 38 to assume the shape of the composite mold cavity as shown in FIG. 4. Mold sections 40 and 42 are cooled, as by means of cooling water ducts 118 connected to a suitable source of cooling water 120 (FIG. 7). This cools and sets the molded plastic, causing it to retain the mold configuration. After the molded article has set for a short period of time, mold sections 40 and 42 are opened and the finished article is removed therefrom.

The cavity walls of mold sections 40 and 42 can be suitably vented to prevent the entrapment of any air between parison 38 and such cavity walls during the blow molding operation. The introduction of expansion fluid into parison 38 causes the same to expand into conformance with the cavity wall defining surfaces of mold sections 40 and 42. Undesired inward collapsing of the parison wall is avoided by the force of the expansion fluid and the elimination of air between parison 38 and mold sections 40 and 42.

The feeding of the raw thermoplastic material into extrusion die 34, the parison extruding operation, the opening and closing of mold sections 40 and 42, the cooling thereof, the supplying of air under pressure to chamber 76, and the introduction of expansion fluid into parison 38 all are controlled in a timed relationship by suitable programming or control means 130. Since such controls are conventional, in and of themselves, they are only schematically shown in FIG. 7 and it is believed that no further description or amplification is necessary.

Although the thermoplastic material used in the above described molding operation is stated to be polyethylene, it should be understood that any suitable thermoplastic material can be employed, as desired. Likewise, this invention is not restricted to a method and apparatus for forming the specific bowl 10 depicted in FIG. 1, but has utility in forming any configurated plastic articles in which it is desired to form wall sections of varied thicknesses. Also, it should be understood that any suitable biased back-up member, such as a spring loaded plate for example, can be used in lieu of the fluid pressure biased piston 78, if desired, within the purview of this invention.

From the foregoing, it is apparent that the objects of the present invention have been fully accomplished. An improved method and apparatus is provided for forming an article having wall sections of varied thicknesses by a combined transfer molding and blow molding technique. Moreover, the outer wall surface conditions of critical portions of the article can be effectively controlled by incorporating a transfer molding operation in a blow molding cycle.

A preferred embodiment of this invention having been disclosed in detail, it is to be understood that this has been done by way of illustration only.

I claim:

1. A method of molding a hollow body comprising: introducing thermoplastic material between a pair of mold sections, moving said mold sections into engagement about the thermoplastic material to sever and enclose a segment thereof, directing a portion of said enclosed thermoplastic material into a cavity formed between opposed portions of said mold sections, further closing said mold sections and providing a predetermined pressure in said cavity to act on said portion of thermoplastic material to thereby displace at least a part of said thermoplastic material portion from said cavity into an adjacent space defined by other portions of said mold sections upon closing movement thereof to completely fill said space and form a wall section on said body, and expanding the remainder of said thermoplastic material against said mold sections to form said hollow body.

2. A method according to claim 1 wherein said segment of enclosed thermoplastic material includes opposed wall portions and said portion of said enclosed thermoplastic material comprising both correspondingly opposed wall portions of said enclosed thermoplastic segment.

3. A method according to claim 1 wherein said predetermined pressure acts on a piston means disposed in said cavity so that the latter means operates to displace said part of said thermoplastic material portion from said cavity into said adjacent space.

4. A method according to claim 1 wherein said remainder of said thermoplastic material is expanded by introducing a fluid thereinto after said mold sections are closed.

* * * * *